G. CRISAMORE.
NON-SKID AND TRACTOR DEVICE.
APPLICATION FILED APR. 8, 1919.
1,344,678.
Patented June 29, 1920.
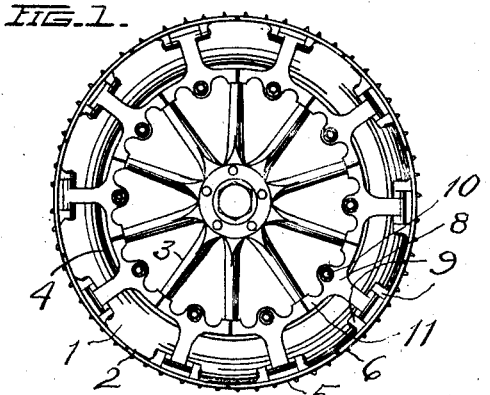
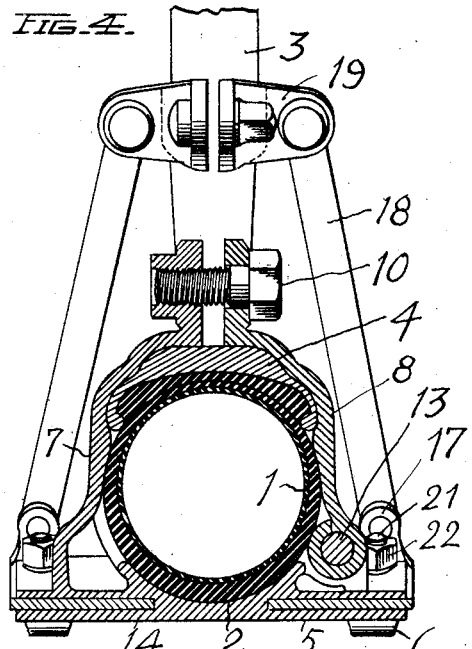
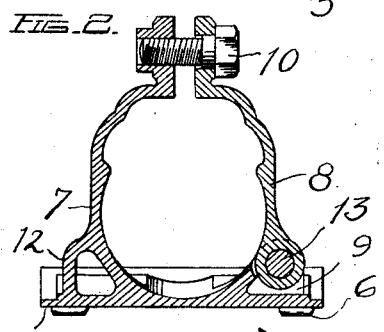
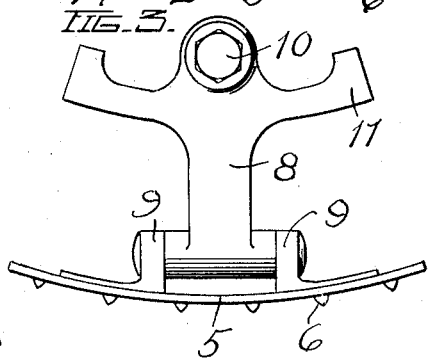
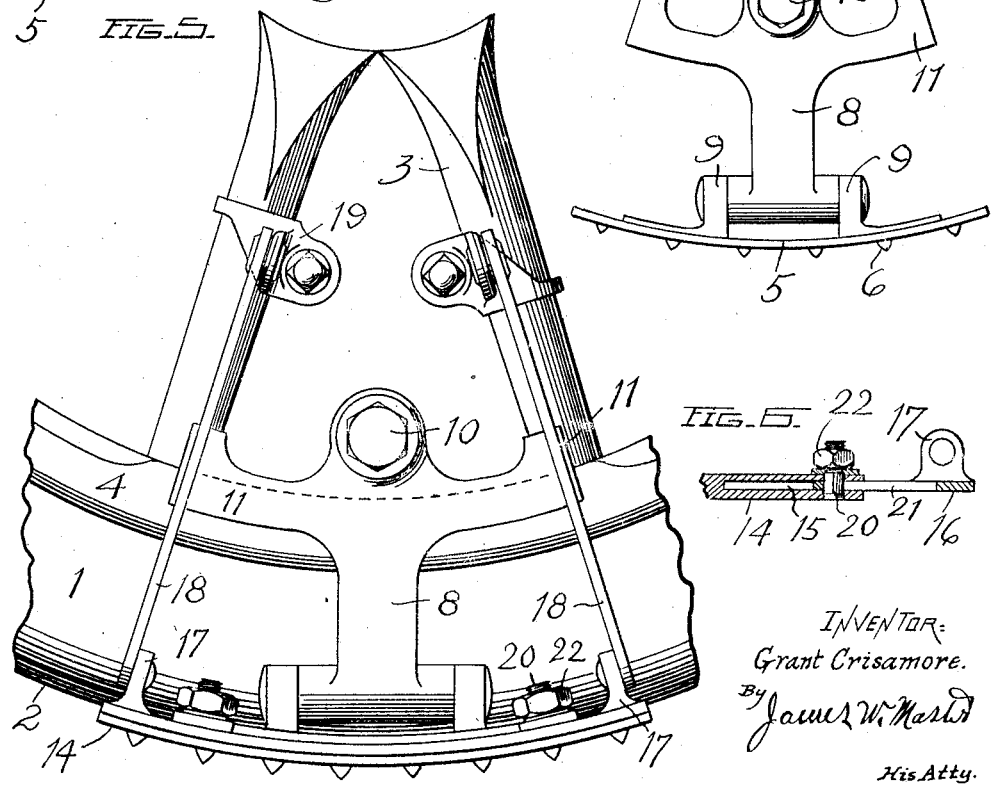
INVENTOR:
Grant Crisamore.
By James W. Martin
His Atty.

UNITED STATES PATENT OFFICE.

GRANT CRISAMORE, OF LOS ANGELES, CALIFORNIA.

NON-SKID AND TRACTOR DEVICE.

1,344,678.   Specification of Letters Patent.   Patented June 29, 1920.

Application filed April 8, 1919. Serial No. 288,492.

*To all whom it may concern:*

Be it known that I, GRANT CRISAMORE, a citizen of the United States, residing at Los Angeles, in the county of Los Angeles and State of California, have invented a new and useful Non-Skid and Tractor Device, of which the following as a specification.

This invention relates to an improved tractor attachment for application to motor vehicle wheels, adapted for non-skid purposes and capable of supporting the vehicle on soft ground where it would otherwise sink to a depth sufficient to greatly retard or prevent locomotion.

The device consists of a plurality of sections each of which is adapted to be clamped to the wheel to form a tread between two consecutive spokes, and the whole, when applied, constituting a metallic tread for the vehicle wheel.

The objects of the invention are to provide a wheel supporting device that may be manufactured at small expense, readily attached to and detached from the wheel, and to provide a device whereby the width of the tread may be varied to suit the conditions of the road.

Other objects and advantages may appear from the subjoined detail description.

In the drawings: Figure 1 is a side elevation of a vehicle wheel to which my invention has been applied. Fig. 2 is a transverse sectional view of the device. Fig. 3 is a side elevation of the same. Fig. 4 is a transverse sectional view of a modified form of the device. Fig. 5 is a side view of the device shown in Fig. 4. Fig. 6 is a fragmentary detail view showing the auxiliary tread member in extended position.

Referring to the drawing, numerals 1, 2, and 3, respectively, designate the motor vehicle wheel tire, the tread portion thereof, and the spokes of the wheel, and numeral 4 designates the wheel rim. My improved device consists of a segmental tread member 5, provided with tractor projections 6, and having an integral strap member 7 adapted to encircle a half of the tire and wheel rim. The strap member 8 is pivotally connected to lugs 9, projecting from the tread member 5, and is connected to member 7 by a bolt 10 which screws into the inner extremity of member 7. The strap member 8 is provided with extensions 11 which are adapted to abut against the consecutive spokes of the wheel to which the device may be attached. Strap member 7 is provided with a brace 12. The pivot member 13 is located adjacent to the tread member 5, allowing the strap member 8 to swing outward for attachment to the wheel.

It is to be understood that the device may be modified to conform to various tires, wheel rims, and with either wooden or wire spokes. The use of this device decreases the ground pressure and distributes the weight of the vehicle over more surface of the ground.

In the modified form shown in Figs. 4, 5, and 6, the tread member 14 is provided with curved slots or grooves 15 in which are mounted segmental tread members 16 which are adapted to be shifted outward when in use. The auxiliary tread members 16 are provided with integral lugs 17, connected by links 18, to clamp members 19, adapted to engage with the spokes of the wheel. The tread member 14 is provided with bolts 20 extending through slots 21, in members 16, and provided with clamping nuts 22. The auxiliary tread members are therefore supported in the extended position by the links 18, and also clamped rigidly in position by the bolts 20 and nuts 22.

The auxiliary tread members provide increased traction in mud, loose soil, drifting sand, and adverse conditions of the roadway. When the device is detached, the individual members thereof may be packed into a small space, and therefore eliminate the unsightly appearance of broad integral metal rims hung upon the body of the vehicle. The device may be made of any suitable metal, and aluminum is preferred for the construction thereof.

What is claimed is:

1. A plurality of segmental members adapted to form a continuous tread for the wheel tire, strap members projecting from each segmental member, means for clamping together oppositely disposed strap members, and integral extensions on the strap members and adapted to abut against consecutive wheel spokes.

2. A tractor attachment comprising a plurality of segmental members forming a relatively flat tread, strap members engaging with the wheel rim, means for securing the strap members together, and brace elements to reinforce the strap members.

3. A tractor attachment for motor vehicles, comprising a plurality of segmental tread members, means for securing the segmental members to the wheel rim and tire to form a continuous tread, auxiliary tread members telescoping within and laterally extensible from the main tread member, means for securing the auxiliary tread members in the extended position, lugs projecting from the auxiliary tread members, clamps adapted to engage with the spokes of the wheel, and links connecting the lugs on the auxiliary tread members and the clamps engaging with the spokes.

4. A tractor attachment for motor vehicles, comprising a plurality of segmental tread members, means for securing the segmental members to the wheel rim, means for spacing the segmental members relative to the wheel spokes, auxiliary tread members laterally extensible from the main tread members, means for securing the auxiliary members in extended position, lugs projecting from the auxiliary tread members, clamp members in engagement with the spokes, and links pivotally connected with the clamp members and the lugs on the auxiliary tread members.

5. The combination with a plurality of main tread members, of auxiliary tread members laterally extensible therefrom, means for securing the main tread members to the wheel rim to form a continuous tread, and means for securing the auxiliary tread members in the extended position.

In testimony whereof I hereunto affix my signature.

GRANT CRISAMORE.